(12) United States Patent
Zink, Jr.

(10) Patent No.: US 7,421,819 B2
(45) Date of Patent: Sep. 9, 2008

(54) AVIAN DECOY WITH REMOVABLE FOOT BASE

(75) Inventor: Fred Lee Zink, Jr., Clayton, OH (US)

(73) Assignee: Avery Outdoors, Inc., Memphis, TN (US)

(*) Notice: Subject to any disclaimer, the term of this patent is extended or adjusted under 35 U.S.C. 154(b) by 85 days.

(21) Appl. No.: 11/176,698

(22) Filed: Jul. 7, 2005

(65) Prior Publication Data

US 2007/0006515 A1    Jan. 11, 2007

(51) Int. Cl.
*A01M 31/06* (2006.01)
(52) U.S. Cl. ............................................................. 43/3
(58) Field of Classification Search .................. 43/2, 43/3
See application file for complete search history.

(56) References Cited

U.S. PATENT DOCUMENTS

| 3,000,203 | A | * | 9/1961 | Olsen | 70/216 |
| 3,863,965 | A | * | 2/1975 | Vickers | 292/66 |
| 4,658,530 | A | * | 4/1987 | Ladehoff | 43/3 |
| 4,885,861 | A | * | 12/1989 | Gazalski | 43/3 |
| 5,205,060 | A | * | 4/1993 | Franceschini | 43/3 |
| 5,375,363 | A | * | 12/1994 | Higdon | 43/3 |
| 5,477,875 | A | * | 12/1995 | Daly, Jr. | 135/95 |
| 6,336,286 | B1 | * | 1/2002 | Liechty, II | 43/3 |
| 6,550,773 | B2 | * | 4/2003 | McKenzie et al. | 273/403 |
| 6,748,690 | B2 | * | 6/2004 | Igo | 43/3 |

* cited by examiner

*Primary Examiner*—Kimberly S Smith
(74) *Attorney, Agent, or Firm*—Walker, McKenzie & Walker, P.C.

(57) ABSTRACT

An avian decoy including a decoy body; a foot base; and a lock for locking the foot base to the decoy body.

2 Claims, 4 Drawing Sheets

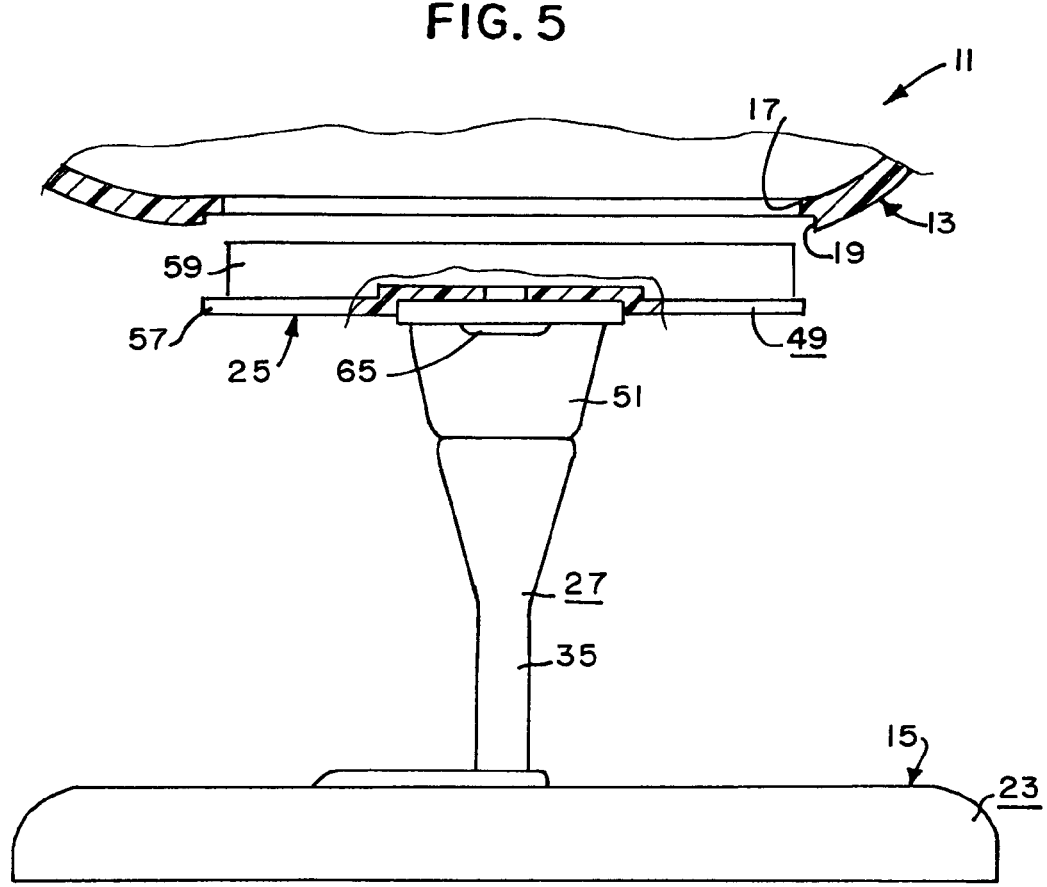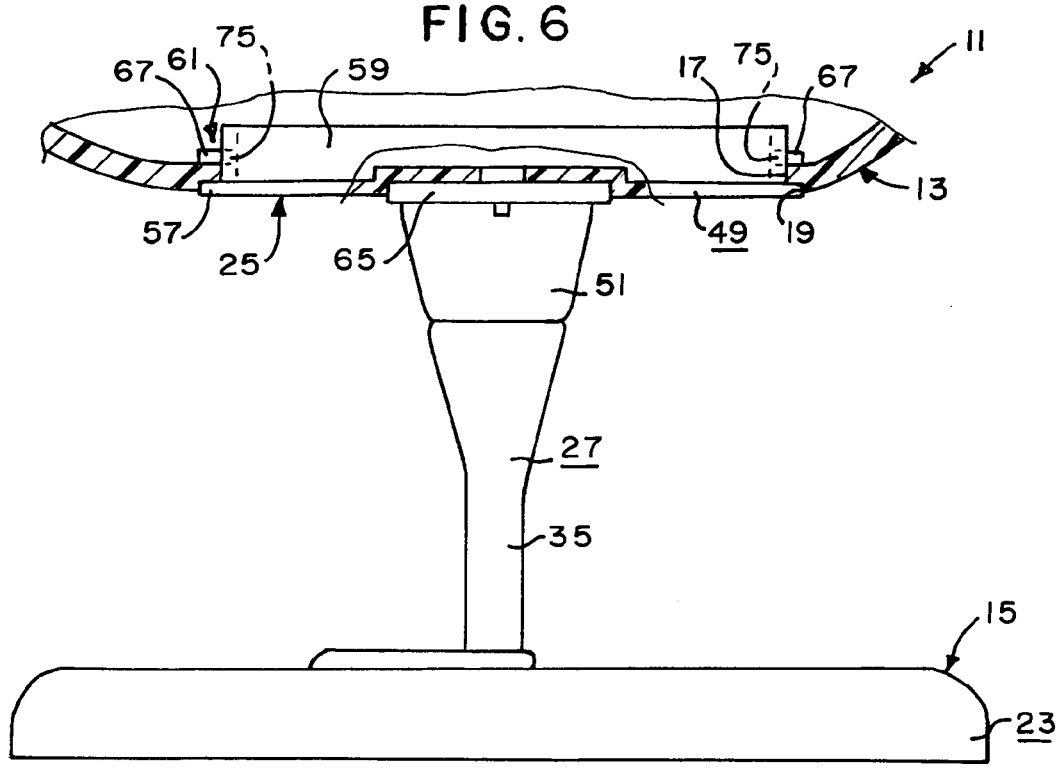

AVIAN DECOY WITH REMOVABLE FOOT BASE

BACKGROUND OF THE INVENTION

1. Field of the Invention

The present invention relates, in general, to avian decoys, and in particular, to a waterfowl decoy with a removable foot base.

2. Background Art

It is often desired to separate the decoy body and foot base for ease in shipping, storage, transporting, etc. Prior art decoys use friction fit parts to connect the decoy body and foot base. Most goose decoys are carried into the hunting field by hand and the friction fit connections between the decoy body and foot base will often fail when so handled, causing the foot base to fall off the decoy body.

Nothing in the know prior art discloses or suggests the present invention.

BRIEF SUMMARY OF THE INVENTION

The present invention provides an avian decoy comprising a decoy body; a foot base; and lock means for locking the foot base to the decoy body.

The decoy of the present invention allows the foot base to be attached to and removed from the decoy body very easily with the twist of a knob. Once the foot base is attached to the decoy body, it is very secure because of locking ear means controlled by the twist knob and locking cam.

BRIEF DESCRIPTION OF THE SEVERAL VIEWS OF THE DRAWINGS

FIG. 5 is a somewhat diagrammatic side elevational view of the avian decoy of the present invention with the decoy body and foot base thereof in a separated position and with portions thereof broken away for clarity.

FIG. 6 is a somewhat diagrammatic side elevational view of the avian decoy of the present invention, similar to FIG. 5 but with the decoy body and foot base thereof in a locked together position.

DETAILED DESCRIPTION OF THE INVENTION

Figure 1:
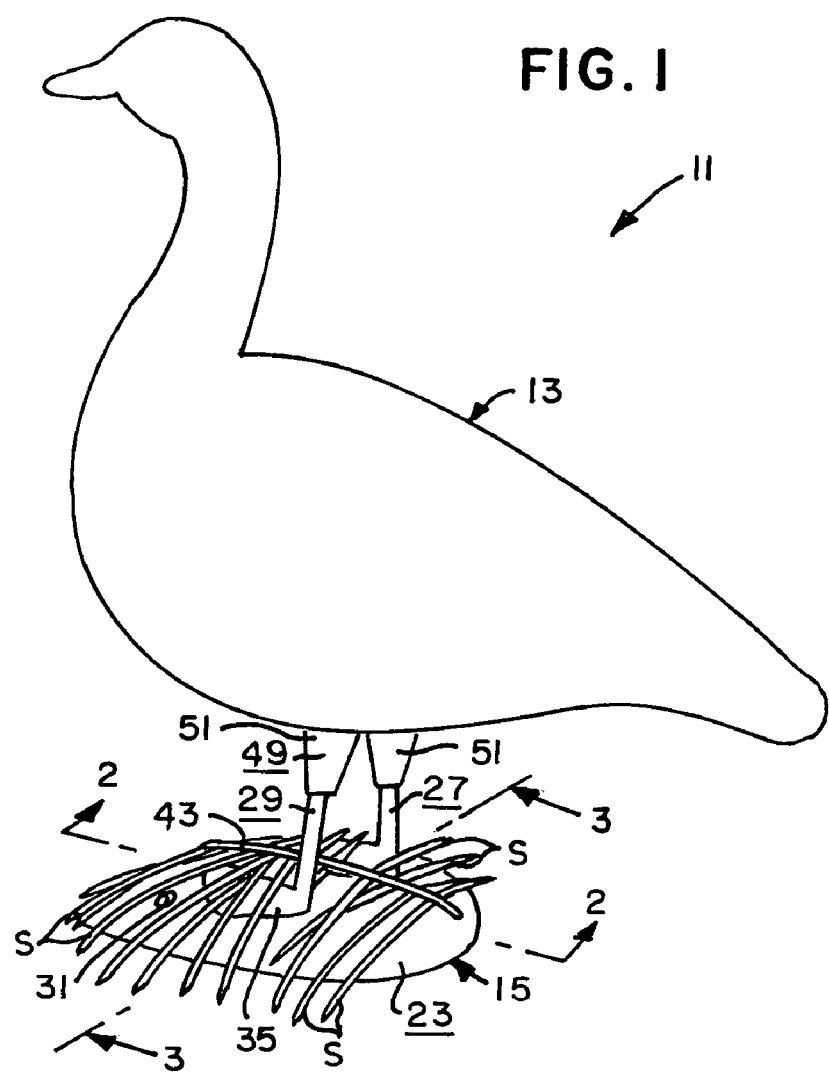
FIG. 1 is a somewhat diagrammatic perspective view of the avian decoy of the present invention.
Figure 2:
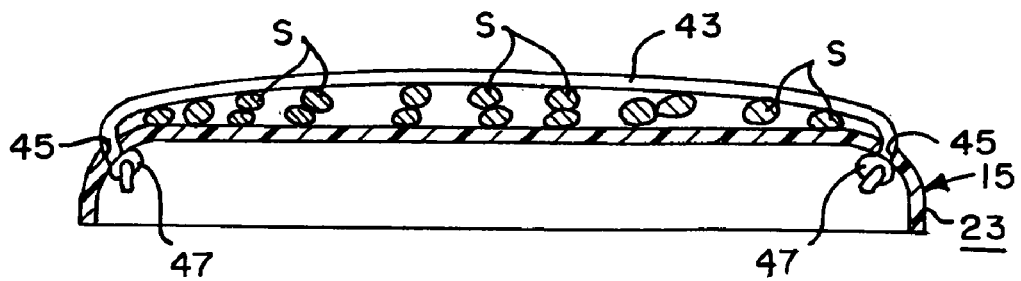
FIG. 2 is a sectional view substantially as taken on line 2-2 of FIG. 1 with portions omitted for clarity.

A preferred embodiment of the avian decoy of the present invention is shown in FIGS. 1-8 and identified by the numeral 11. The decoy 11 includes, in general, a decoy body 13 and a foot base 15 removably attached to the decoy body 13.

The decoy body 13 may be molded or otherwise constructed out of various materials such as plastic (e.g., polyvinyl chloride-PVC) in various shapes and sizes to have the appearance of a duck, goose, or the like. The actual appearance of the decoy body 13 may vary depending on the user's desires. Thus, the decoy body 13 may have the general appearance of a feeder goose, looker goose, active goose, etc., as will now be apparent to those skilled in the art. The bottom of the decoy body 13 has a female receiver or aperture 17 (see FIGS. 4-6) for receiving a portion of the foot base 15. The edge of the aperture 17 may be provided with a recessed rim 19 for enhancing proper positioning of the foot base 15 on the decoy body 13. Receiver holes or indentations 21 may be provided on opposite sides of the aperture 17 for additionally enhancing proper positioning of the foot base 15 on the decoy body 13.

The foot base 15 includes a bottom disk or base 23 for resting on the ground or other support surface, an upper disk or base 25 for attachment to the decoy body 13, a right leg assembly 27 for joining the bottom base 23 and the upper base 25, and a left leg assembly 29 for also joining the bottom base 23 and the upper base 25.

The bottom base 23 may be molded or otherwise constructed out of various materials such as plastic (e.g., polyvinyl chloride -PVC) in various shapes and sizes to properly support the decoy body 13 on the support surface. Thus, for example, the bottom base 23 may have a round plate-like shape with a diameter of approximately 10.5 inches (25.4 centimeters). The bottom base 23 may have one or more holes 31 therethrough (see FIG. 1) for allowing a stake or the like (not shown) to be extended therethrough into the support surface to securely anchor the bottom base 23, and, thus, the decoy 11, to the support surface.

Each leg assembly 27, 29 includes an elongated central rod 33 (see FIG. 3) for extending between the bottom and upper bases 23, 25. Each rod 33 preferably consists of an elongated, threaded metal rod or the like to provide each leg assembly 27, 29 with a lot of strength. Further, each leg assembly 27, 29 includes a outer portion 35 for providing a realistic, natural appearance of the outer lower leg and foot of the avian decoy 11, and for separating the bottom and upper bases 23, 25. Each outer portion 35 may be molded or otherwise constructed out of various materials such as plastic (e.g., polyvinyl chloride-PVC) in various shapes and sizes to realistically resemble the lower leg and foot of the avian decoy 11. Thus, for most waterfowls and the like, each outer portion 35 will have a non-feathered black skin with web feet. The rods 33 are preferably molded in the respective outer portion 35.

Figure 3:
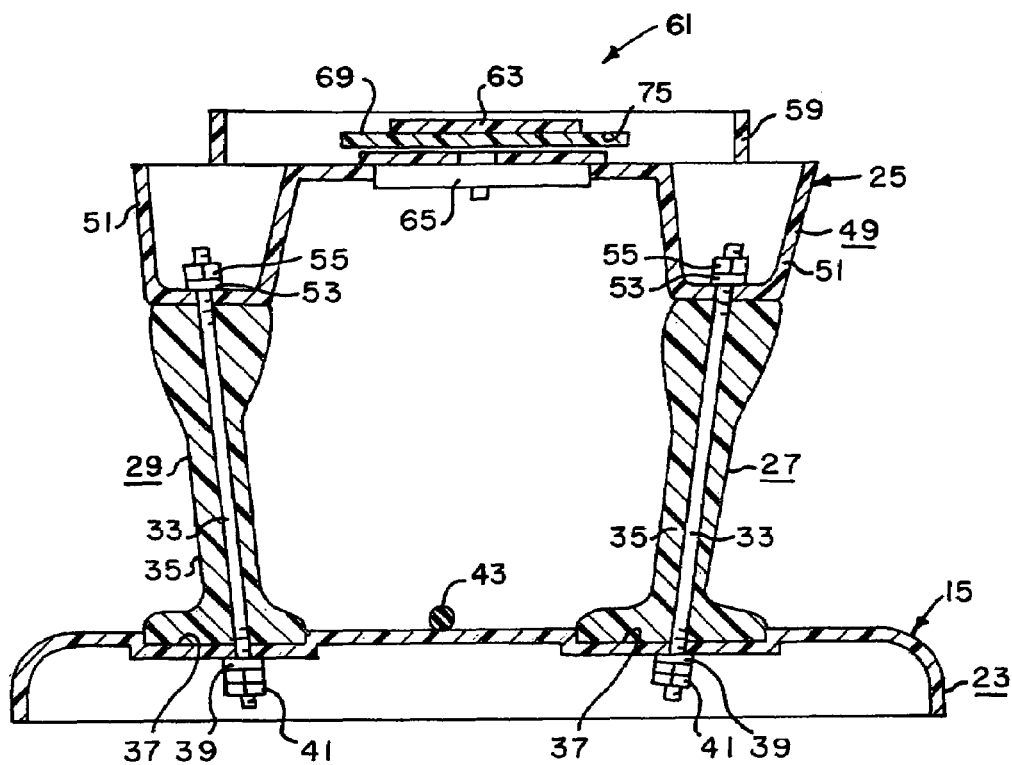
FIG. 3 is a sectional view substantially as taken on line 3-3 of FIG. 1 with portions omitted for clarity.
Figure 4:
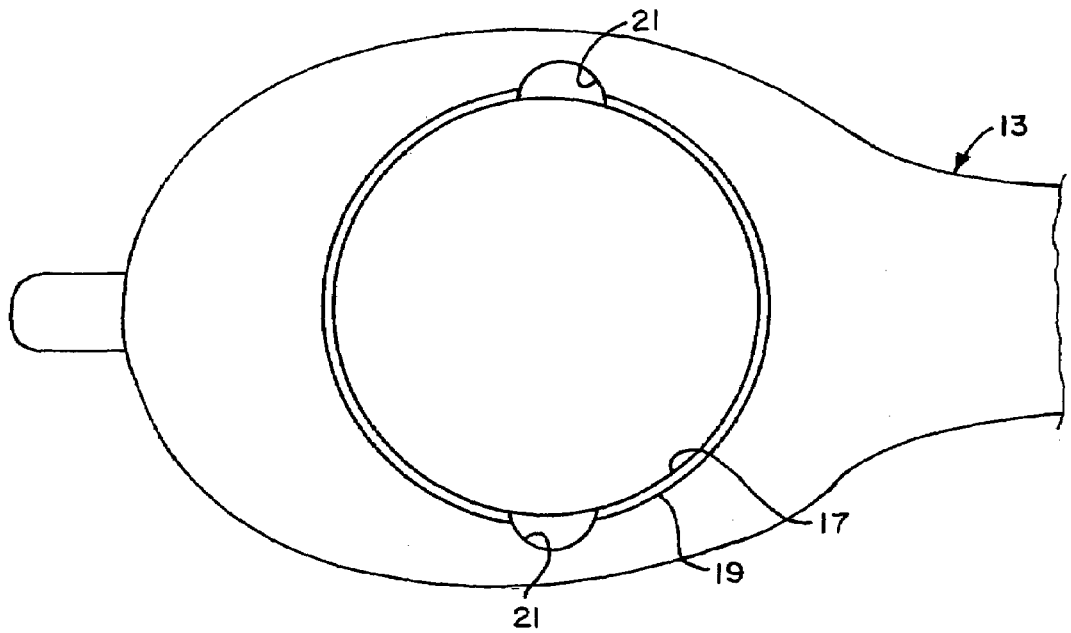
FIG. 4 is a somewhat diagrammatic bottom plan view of the decoy body of the avian decoy of the present invention with portions thereof broken away for clarity.

The bottom base 23 may have indentations 37 for positioning the feet of each outer portion 35 (see FIG. 3). Washers 39 and lock nuts 41 are provided (see FIG. 3) for securing the rods 33, and thus the leg assemblies 27, 29 to the bottom base 23. One or more additional screws (not shown) may be provided for extending through the bottom base 23 and into a foot of a respective outer portion 35 to provide additional attachment of the leg assemblies 27, 29 to the bottom base 23.

A stubble cord 43 is preferably attached to the bottom base 23 for allowing stubble S (e.g., weeds, grass, etc.) to be mounted over the bottom base 23 (see FIGS. 1 and 2) to camouflage the bottom base 23, etc., in the natural environment. The stubble cord 43 is preferably a length of elastic cord with the opposite ends extending through apertures 45 in the bottom base 23 and tied into knots 47 (see FIG. 2) to thereby secure the stubble cord 43 to the lower base 23.

The upper base 25 may be molded or otherwise constructed out of various materials such as plastic (e.g., polyvinyl chloride-PVC) in various shapes and sizes to further the appearance of the decoy 11 and removably attach the decoy body 13 to the leg assemblies 27, 29 and bottom base 23. Thus, the upper base 25 may include a body member 49 for covering the female receiver or aperture 17 in the bottom of the decoy body 13. The body member 49 is provided with a pair of bulbous portions 51 on opposite sides thereof to portray the feathered upper leg or thigh portions of the avian decoy 11, and to receive the upper ends of respective leg assemblies 27, 29 (see, e.g., FIG. 3). The receiver holes or indents 21 in the decoy body 13 are sized and positioned to receive upper ends of the bulbous portions 51. Washers 53 and lock nuts 55 are provided (see FIG. 3) for securing the rods 33, and thus the leg assemblies 27, 29 to the body member 49. The body member 49 preferably has a lip 57 for engaging or abutting the recessed rim 19 of the female receiver or aperture 17 of the decoy body 13, and a neck portion 59 for extending into the female receiver or aperture 17 of the decoy body 13 (see, e.g., FIGS. 5 and 6). Since the color of the feathered upper leg or thigh portions of an avian is typically different than that of the non-feathered lower leg and foot thereof, the natural color of the feathered upper leg or thigh portions represented by the bulbous portions 51 can be created by the choice of molding material.

Figure 7:
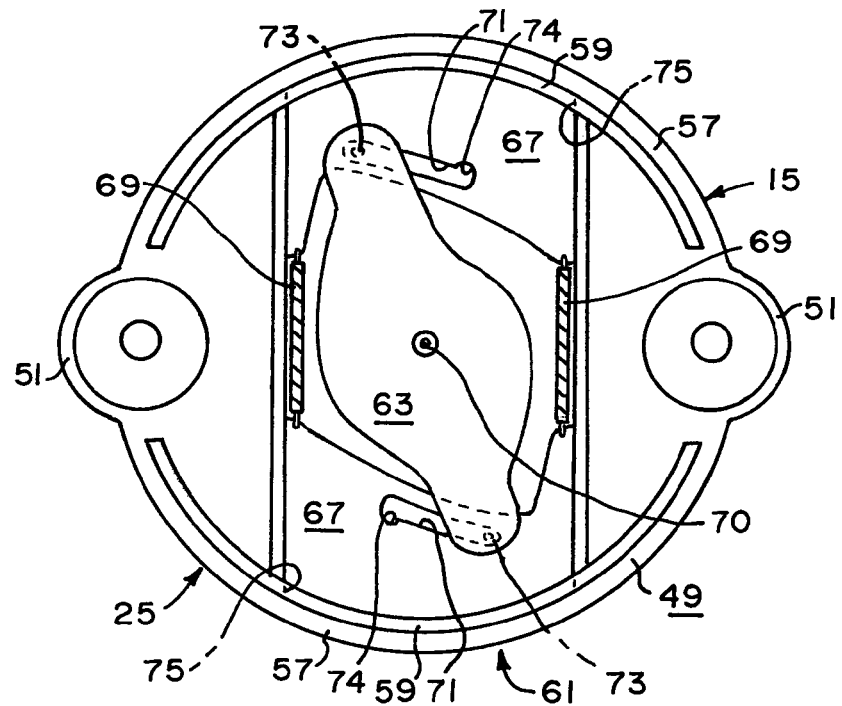
FIG. 7 is a somewhat diagrammatic top plan view of the foot base of the avian decoy of the present invention, shown in an unlocked position and with portions thereof omitted for clarity.
Figure 8:
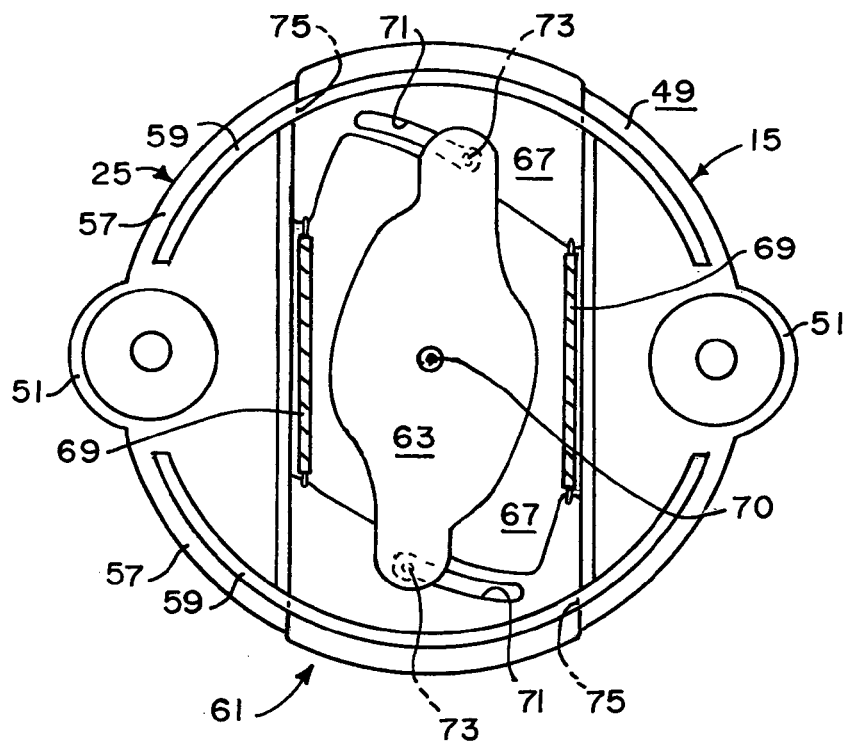
FIG. 8 is a somewhat diagrammatic top plan view of the foot base of the avian decoy of the present invention, similar to FIG. 7 but shown in a locked position.

The decoy 11 includes lock means 61 (see FIGS. 3 and 6-8) for locking the upper base 25 to the decoy body 13. The lock means 61 include a cam 63 rotatably mounted to the body member 49 and rotatable by a twist knob 65, a pair of ears 67 slidably mounted on the body member 49, and springs 69 to normally pull the ears 67 inward toward one another. A screw 70 may be used to secure the cam 63 to the knob 65. Each ear 67 has cam follower slots 71 therein and the cam 63 has pins 73 for engaging a respective slot 71 (see FIGS. 7 and 8) so that rotation of the knob 65 in a counter-clockwise direction will cause the cam 63 to rotate which will, in turn, cause the ears 67 to move between a retracted, unlocked position as shown in FIGS. 5 and 7, and an extended, locked position as shown in FIGS. 6 and 8. Each cam follower slot 71 has an enlarged end 74 for coacting with the springs 69 to help hold the ears 67 in the extended, locked positions until the knob 15 is intentionally rotated in a clockwise direction as will now be apparent to those skilled in the art. When in the extended, locked position, the outer ends of the ears 67 extend through slots 75 in the neck portion 59 of the body member 49 to trap and lock the decoy body 13 between the outer ends of the ears 67 and the lip 57 of the body member 49 as shown in FIG. 6.

To attach the foot base 13 to the decoy body 13, the decoy body 13 is turned over on its back and placed on a hard support surface. With the ears 67 in the retraced, unlocked positions, the neck portion 59 of the body member 49 of the upper base 25 is inserted into the aperture 17 in the bottom of the decoy body 13, making sure that the feet are facing the front of the decoy body 13 and the bulbous portions 51 engage the receiver holes or indentations 21 in the decoy body 13. The twist knob 65 is then turned counter-clockwise until a "snap" is heard indicating that the edge of the aperture 17 is trapped between the ears 67 and the lip 57 and that the foot base 15 is locked securely into place. To remove the foot base 15 from the decoy body 13, these steps are merely reversed. The foot base 15 should be removed with the decoy body 13 turned over and on its back to avoid damaging the decoy body 13 or foot base 15.

Although the present invention has been described and illustrated with respect to a preferred embodiment and a preferred use therefor, it is not to be so limited since modifications and changes can be made therein which are within the full intended scope of the invention.

The invention claimed is:
1. An avian decoy comprising:
    (a) a decoy body;
    (b) a foot base; and
    (c) lock means for locking said foot base to said decoy body; said lock means including a cam rotatably mounted to said foot base, a knob for rotating said cam, a pair of ears slidably mounted on said foot base for movement between refracted positions unlocking said foot base from said decoy body and extended positions locking said foot base to said decoy body when said cam is rotated, and springs to normally pull said ears to said retracted positions; each of said ears of said lock means having cam follower slots therein; and said cam of said lock means having pins for engaging a respective one of said cam follower slots so that rotation of said knob will cause said cam to rotate and cause said ears to move between said extended and retracted positions.
2. The decoy of claim 1 in which each of said cam follower slots has an offset portion for coacting with said springs to help bold said ears in the extended positions until said knob is intentionally rotated.

* * * * *